(12) United States Patent
Zheng et al.

(10) Patent No.: US 11,345,051 B2
(45) Date of Patent: May 31, 2022

(54) AUTOMATIC UNLOADING CARRIER AND UNMANNED AERIAL VEHICLE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Yi Zheng, Beijing (CN); Lei Yu, Beijing (CN); Yanguang Liu, Beijing (CN); Hang Ba, Beijing (CN); Yanjun Cui, Beijing (CN); Jinhao Xu, Beijing (CN); Jun Dou, Beijing (CN); Chengbin Liu, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 559 days.

(21) Appl. No.: 16/343,558

(22) PCT Filed: Oct. 13, 2017

(86) PCT No.: PCT/CN2017/106123
§ 371 (c)(1),
(2) Date: Apr. 19, 2019

(87) PCT Pub. No.: WO2018/072654
PCT Pub. Date: Apr. 26, 2018

(65) Prior Publication Data
US 2020/0047353 A1 Feb. 13, 2020

(30) Foreign Application Priority Data
Oct. 21, 2016 (CN) .......................... 201610920792.3

(51) Int. Cl.
*B25J 15/10* (2006.01)
*B64D 9/00* (2006.01)
(Continued)

(52) U.S. Cl.
CPC ................. *B25J 15/10* (2013.01); *B64D 9/00* (2013.01); *B25J 19/02* (2013.01);
(Continued)

(58) Field of Classification Search
CPC .......... B25J 15/10; B25J 19/02; B25J 15/022; B64D 9/00; B64D 1/02; B64D 1/22;
(Continued)

(56) References Cited

U.S. PATENT DOCUMENTS 5,535,883 A * 7/1996 Henderson ................ F25D 3/08
206/427
5,868,357 A * 2/1999 Gabriel .................... B64D 1/22
244/137.1
(Continued)

FOREIGN PATENT DOCUMENTS

CN 203680313 U 7/2014
CN 203843849 U 9/2014
(Continued)

OTHER PUBLICATIONS

International Search Report dated Jan. 9, 2018 in PCT/CN2017/106123 filed on Oct. 13, 2017.
(Continued)

*Primary Examiner* — Medhat Badawi
(74) *Attorney, Agent, or Firm* — Oblon, McClelland, Maier & Neustadt, L.L.P.

(57) ABSTRACT

The present disclosure relates to an automatic unloading carrier and an unmanned aerial vehicle. The automatic unloading carrier includes: a mounting base for being fixed with an unmanned carrying vehicle, a carrying arm driving
(Continued)

mechanism and multiple carrying arms connected with the mounting base through the carrying arm driving mechanism, the multiple carrying arms are configured to be unfolded or folded due to the driving of the carrying arm driving mechanism, and the multiple carrying arms are configured to form a space for carrying a carried object during a folded state and release the carried object during an unfolded state.

19 Claims, 4 Drawing Sheets

(51) Int. Cl.
  *B25J 19/02* (2006.01)
  *B64D 1/02* (2006.01)
  *B64D 1/22* (2006.01)
(52) U.S. Cl.
  CPC .. *B64C 2201/024* (2013.01); *B64C 2201/128* (2013.01); *B64D 1/02* (2013.01); *B64D 1/22* (2013.01)
(58) Field of Classification Search
  CPC ........ B64C 2201/024; B64C 2201/128; B64C 2201/027; B64C 39/024
  See application file for complete search history.

(56) References Cited

U.S. PATENT DOCUMENTS

| | | | | |
|---|---|---|---|---|
| 6,179,357 | B1* | 1/2001 | Gabriel | B64D 1/22 |
| | | | | 294/118 |
| 9,412,280 | B1* | 8/2016 | Zwillinger | G05D 1/0676 |
| 9,422,139 | B1* | 8/2016 | Bialkowski | B64C 39/024 |
| 9,448,562 | B1* | 9/2016 | Sirang | B64C 39/024 |
| 9,481,458 | B2* | 11/2016 | Casado Magana | B60L 3/0046 |
| 9,561,852 | B1* | 2/2017 | Beaman | B64C 37/02 |
| 9,567,081 | B1* | 2/2017 | Beckman | B64C 1/22 |
| 9,676,481 | B1* | 6/2017 | Buchmueller | B64D 1/02 |
| 9,688,404 | B1* | 6/2017 | Buchmueller | G06Q 10/083 |
| 9,957,048 | B2* | 5/2018 | Gil | B64C 39/024 |
| 9,969,494 | B1* | 5/2018 | Buchmueller | G05D 1/0858 |
| 9,981,834 | B2* | 5/2018 | Bialkowski | G05D 1/0858 |
| 10,040,370 | B2* | 8/2018 | Wei | B64D 27/24 |
| 10,071,804 | B1* | 9/2018 | Buchmueller | B64D 1/08 |
| 10,246,187 | B2* | 4/2019 | Cantrell | B64D 1/22 |
| 10,249,200 | B1* | 4/2019 | Grenier | G05D 1/0088 |
| 10,274,952 | B2* | 4/2019 | Cantrell | B64C 39/024 |
| 10,775,792 | B2* | 9/2020 | Cooper | G06Q 10/083 |
| 10,807,714 | B2* | 10/2020 | Atchley | B64C 39/024 |
| 10,899,449 | B2* | 1/2021 | Luckay | B64D 1/22 |
| 11,168,487 | B2* | 11/2021 | Wankewycz | E04H 6/44 |
| 11,174,045 | B2* | 11/2021 | Gil | B64F 5/60 |
| 2016/0159472 | A1* | 6/2016 | Chan | B64C 27/37 |
| | | | | 244/39 |
| 2016/0272312 | A1* | 9/2016 | Mallard | B64C 29/0033 |
| 2017/0316375 | A1* | 11/2017 | Gil | G06Q 10/083 |
| 2018/0370618 | A1* | 12/2018 | Harris | B64C 25/24 |
| 2020/0047353 | A1* | 2/2020 | Zheng | B64D 9/00 |

FOREIGN PATENT DOCUMENTS

| | | |
|---|---|---|
| CN | 205166952 U | 4/2016 |
| CN | 205381403 U | 7/2016 |
| CN | 105947218 A | 9/2016 |
| CN | 205633051 U | 10/2016 |
| CN | 206125440 U | 4/2017 |
| CN | 106892119 A | 6/2017 |
| EP | 2 361 831 A2 | 8/2011 |
| KR | 10-2011-0024616 A1 | 3/2011 |

OTHER PUBLICATIONS

Indian Office Action dated Nov. 15, 2021 in Indian Patent Application No. 201937019823 (with English translation), 5 pages.

* cited by examiner

AUTOMATIC UNLOADING CARRIER AND UNMANNED AERIAL VEHICLE

The present application is based on the CN application with an application number of 201610920792.3 and an application date of Oct. 21, 2016, and claims its priority. The disclosure contents of the CN application are hereby incorporated by reference in the entirety herein.

TECHNICAL FIELD

The present disclosure mainly relates to the field of unmanned transportation, and in particular to an automatic unloading carrier and an unmanned aerial vehicle.

BACKGROUND

An unmanned aircraft is referred to as an "unmanned aerial vehicle" and is a flight device that is operated by a radio remote control device and a self-contained program control apparatus. Civilian unmanned aerial vehicles have a wide range of applications, including aerial photography, agriculture, plant protection, self-photographing, express delivery, disaster relief, observation of wildlife, surveillance of infectious diseases, surveying and mapping, news reporting, power routing inspection, disaster relief, video shooting, etc.

In the above-mentioned various unmanned aerial vehicle applications, the express delivery can greatly save the manpower and material resources and improve the transportation efficiency. Therefore, unmanned aerial vehicle freight transport may become a more mainstream transportation mode in the future. For an unmanned aerial vehicle transportation mode known to the inventors, a shipper generally installs a cargo in a special carrier of the unmanned aerial vehicle, for example, in a dragnet below the unmanned aerial vehicle, and then operates the unmanned aerial vehicle to rise and fly to an unloading place. After the unmanned aerial vehicle arrives at the unloading place, the unmanned aerial vehicle lands on the ground, then a consignee at the unloading place opens the special vehicle and takes out the cargo.

SUMMARY

The inventors have recognized that in the unmanned aerial vehicle transportation mode involved in the background art, the unmanned aerial vehicle mainly functions as transportation on the way. At the starting point and the destination of the transportation, personnel are required to cooperate with the unmanned aerial vehicle, which takes up a lot of manpower, and it is often necessary for the consignee to have certain unloading experience especially at the unloading place so as to avoid misoperation in an unloading process which causes that the unmanned aerial vehicle cannot normally take off. On the other hand, if the consignee is not at the unloading place when the unmanned aerial vehicle arrives, the unmanned aerial vehicle needs to stay at the unloading place for a long time and can only take off and return until the consignee arrives and takes out the cargoes, so that the efficiency of the unmanned aerial vehicle is greatly affected absolutely.

In view of this, the embodiments of the present disclosure provide an automatic unloading carrier and an unmanned aerial vehicle, which can improve the article transportation efficiency of the unmanned carrying vehicle.

According to one aspect of the present disclosure, an automatic unloading carrier is provided, including: a mounting base, for being fixed with an unmanned carrying vehicle; a carrying arm driving mechanism; and multiple carrying arms, connected with the mounting base through the carrying arm driving mechanism, and configured to be unfolded or folded due to the driving of the carrying arm driving mechanism; wherein the multiple carrying arms are configured to form a space for carrying a carried object during a folded state and release the carried object during an unfolded state.

In some embodiments, each of the multiple carrying arms includes an arm body and a supporting portion, the supporting portion is formed or arranged on the arm body, wherein the carried object is supported and clamped by the arm body and the supporting portion during the folded state of the multiple carrying arms, and the supporting and clamping limitations on the carried object are released by the arm body and the supporting portion during the unfolded state of the multiple carrying arms.

In some embodiments, the arm body has a root and a free end, wherein the root of the arm body is articulated with the carrying arm driving mechanism so as to be rotatable relative to the mounting base under the driving of the carrying arm driving mechanism, and the supporting portion of each of the carrying arms is at least formed or arranged at the free end of the arm body so as to approach to each other or separate from each other with the rotation of the arm body.

In some embodiments, the multiple carrying arms include at least two groups of carrying arms, the at least two groups of carrying arms are located on different sides of the carried object respectively.

In some embodiments, each group of the at least two groups of carrying arms includes at least two carrying arms, and the at least two carrying arms in each group are fixedly connected with each other through a connector and uniformly arranged relative to a side of the carried object.

In some embodiments, different groups of carrying arms located on opposite sides coincide are rotatable in a same plane.

In some embodiments, the arm body has a root and a free end, and the sectional dimension of the arm body gradually decreases from the root to the free end.

In some embodiments, the arm body has a free end, and a reinforced structure is arranged on the arm body adjacent to the free end.

In some embodiments, multiple weight-reducing holes are formed on the arm body.

In some embodiments, the carrying arm driving mechanism includes a power output element and a transmission element, wherein the power output element is fixedly mounted on the mounting base and connected with the multiple carrying arms through the transmission element, and the power output element is configured to drive the multiple carrying arms to move or rotate relative to the mounting base by outputting power, so as to switch a unfolded state and a folded state of the multiple carrying arms.

In some embodiments, the carrying arm includes an arm body and a supporting portion, the arm body has a root, the supporting portion is formed or arranged on the arm body, the transmission element includes a first connecting rod and a second connecting rod, two ends of the first connecting rod are rotatably connected with the root of the arm body and the mounting base respectively, two ends of the second connecting rod are rotatably connected with the root of the arm body and an output end of the power output element, and a rotation axis of the first connecting rod at the root of the arm body does not coincide with a rotation axis of the second connecting rod at the root of the arm body.

In some embodiments, the multiple carrying arms include at least two groups of carrying arms, each group of carrying arms include at least two carrying arms, a first connecting shaft and a second connecting shaft having different rotation axes are fixedly connected between the roots of the arm bodies of the at least two carrying arms in each group of carrying arms, and the first connecting rod and the second connecting rod are respectively pivoted with the first connecting shaft and the second connecting shaft.

In some embodiments, the power output element includes a linear motor, an air cylinder or a hydraulic cylinder, a connecting base is fixedly connected with the output end of the power output element, and the output end of the power output element is articulated with the second connecting rod through the connecting base.

In some embodiments, further including a position detection switch for detecting whether the carried object arrives at a loading position between the multiple carrying arms, so that the carrying arm driving mechanism drives the multiple carrying arms to fold when the carried object arrives at the loading position.

In some embodiments, the carrying arm driving mechanism includes a power output element and a transmission element, the power output element is fixedly mounted on the mounting base and connected with the multiple carrying arms through the transmission element, the position detection switch includes a contact sensing unit, a connecting base is fixedly connected to an output end of the power output element, and the contact sensing unit is arranged at a position corresponding to the carried object below the connecting base, so as to be triggered by the carried object in a contact or extrusion manner when the carried object arrives at the loading position.

In some embodiments, the contact sensing unit is a sensitive switch.

In some embodiments, the unmanned carrying vehicle includes an unmanned aerial vehicle or an unmanned vehicle, and the carrying arm driving mechanism is automatically controlled by a controller on the unmanned aerial vehicle or the unmanned vehicle or remotely controlled by a shipper of the carried object to achieve unfolding or folding of the multiple carrying arms.

In some embodiments, the unmanned carrying vehicle is an unmanned aerial vehicle, the arm body has an free end, wherein the free ends of the arm bodies of at least three carrying arms of the multiple carrying arms are located on a same horizontal plane in the unfolded state of the multiple carrying arms, so as to support the unmanned aerial vehicle during taking off and landing.

According to another aspect of the present disclosure, an unmanned aerial vehicle is provided, including a engine body and flying wings, wherein the unmanned aerial vehicle further includes the foregoing automatic unloading carrier, and the automatic unloading carrier is arranged below the engine body through the mounting base.

In some embodiments, further including an undercarriage arranged below the engine body, wherein the automatic unloading carrier is located between frameworks of the undercarriage.

Therefore, according to the embodiments of the present disclosure, the multiple carrying arms are used for loading the carried object, and the carrying arms are unfolded or folded due to the driving of the carrying arm driving mechanism so as to achieve the carrying and releasing of the carrying arms to the carried object, therefore, the automatic unloading of the carried object by the unmanned carrying vehicle can be achieved, the unmanned carrying vehicle doesn't need to cooperate with the consignees to unload, so the requirements for personnel cooperation are low. On the other hand, since the unmanned carrying vehicle can return or go to the next delivery place after unloading at the delivery place, it does not need to stay at the current unloading place for a long time, thus the delivery efficiency of the unmanned carrying vehicle is greatly improved.

Other features of the present disclosure and advantages thereof will become apparent from the following detailed description of exemplary embodiments of the present disclosure with reference to the drawings.

BRIEF DESCRIPTION OF THE DRAWINGS

The drawings illustrated herein are used for providing a further understanding of the present disclosure, and constitute a part of the present application, and exemplary embodiments of the present disclosure and illustrations thereof are used for explaining the present disclosure, and do not constitute improper limitations to the present disclosure. In the drawings.

DETAILED DESCRIPTION

A clear and complete description of technical solutions in the embodiments of the present disclosure will be given below, in combination with the drawings in the embodiments of the present disclosure. Apparently, the embodiments described below are merely a part, but not all of the embodiments of the present disclosure. The following description of at least one exemplary embodiment is merely illustrative and is in no way intended as a limitation. All of other embodiments, obtained by those of ordinary skill in the art based on the embodiments of the present disclosure without any creative effort, fall into the protection scope of the present disclosure.

The terms "first", "second" and the like appearing in the present disclosure are merely for the convenience of description to distinguish different components having the same name, and do not indicate precedence relationship or major and minor relationship. In the description of the present disclosure, it should be understood that the orientation or positional relationships indicated by the terms "length", "width", "thickness" and the like are based on the orientation or positional relationships shown in the drawings, only for the convenience of describing the present disclosure, rather than indicating or implying that the device referred to must have a particular orientation, constructed and operated in a particular orientation, and thus cannot be construed as a limitation to the protection scope of the present disclosure.

Unless otherwise specified, the relative arrangement of the components and steps, numerical expressions and numerical values set forth in the embodiments are not intended to limit the scope of the present disclosure. In the meantime, it should be understood that the dimensions of the various parts shown in the drawings are not drawn in the actual scale relationship for the convenience of description. Techniques, methods and devices known to those of ordinary skill in the relevant art may not be discussed in detail, but where appropriate, the techniques, methods and devices should be considered as a part of the authorized specification. In all examples shown and discussed herein, any specific value should be construed as merely illustrative and is not used as a limitation. Thus, other examples of the exemplary embodiments can have different values. It should be noted that similar reference signs and letters indicate similar items in the following figures, and thus, once a certain item is defined in a drawing, it is not required to be further discussed in the subsequent drawings.

Figure 1:
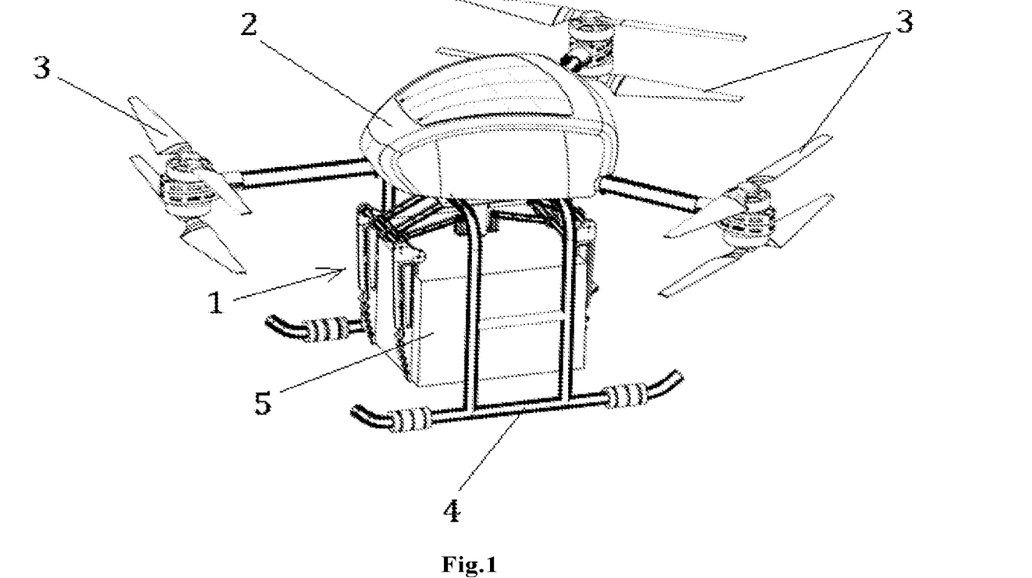
FIG. 1 is a structural schematic diagram of an embodiment of an unmanned aerial vehicle of the present disclosure.

As shown in FIG. 1, it is a structural schematic diagram of an embodiment of an unmanned aerial vehicle of the present disclosure. In the present embodiment, the unmanned aerial vehicle includes a engine body 2, flying wings 3, and an automatic unloading carrier 1. The engine body 2 includes various types of electrical components and power supply components required for the unmanned aerial vehicle, such as a circuit board, a flight control system, a battery, and the like. The flying wings 3 are connected with the engine body 2 and are capable of executing a lifting and lower function of the unmanned aerial vehicle. The flying wings 3 can use the form of fixed wings or rotating wings as shown in FIG. 1, and can also use a combination form of the fixed wings and the rotating wings.

The automatic unloading carrier 1 is a tool used for carrying a carried object 5 and is installed below the engine body 2 to unload at any geographical position or automatically unload at a delivery place based on needs. The unloading place can be a preset height in the air. The automatic unloading carrier 1 can also realize a self-unloading operation after landing.

FIG. 2-6 show some specific embodiments of the automatic unloading carrier 1. Referring to FIG. 2-6, in some embodiments, the automatic unloading carrier 1 specifically includes a mounting base 11, multiple carrying arms 12, and a carrying arm driving mechanism. The mounting base 11 is used for be fixed with an unmanned carrying vehicle. With respect to the unmanned aerial vehicle shown in FIG. 1, the automatic unloading carrier 1 can be arranged below the engine body 2 of the unmanned aerial vehicle through the mounting base 11. The multiple carrying arms 12 can be connected with the mounting base 11 through the carrying arm driving mechanism and can be unfolded or folded due to the driving of the carrying arm driving mechanism. The multiple carrying arms 12 can form a space for carrying the carried object 5 during a folded state, and the carried object 5 in the space can be stably carried by the unmanned aerial vehicle for lifting. The multiple carrying arms 12 can release the carried object 5 during an unfolded state of the multiple carrying arms 12, so that the carried object 5 can be driven by its own gravity or by other components to deviate from the carrying arms 12.

Figure 2:
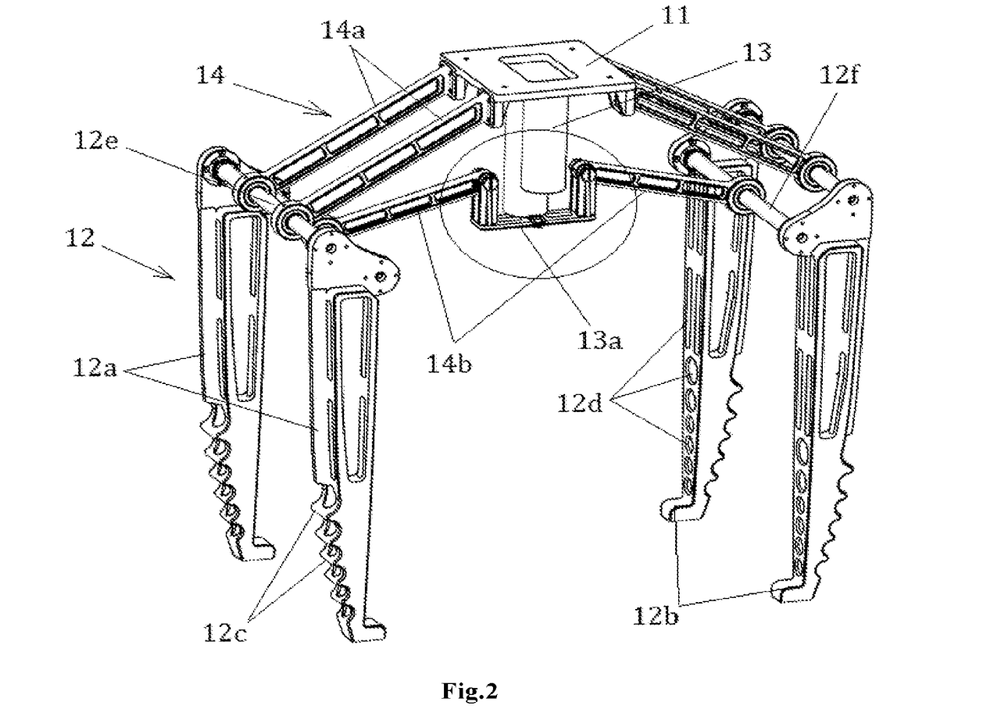
FIG. 2 is a structural schematic diagram of an embodiment of an automatic unloading carrier of the present disclosure.
Figure 3:
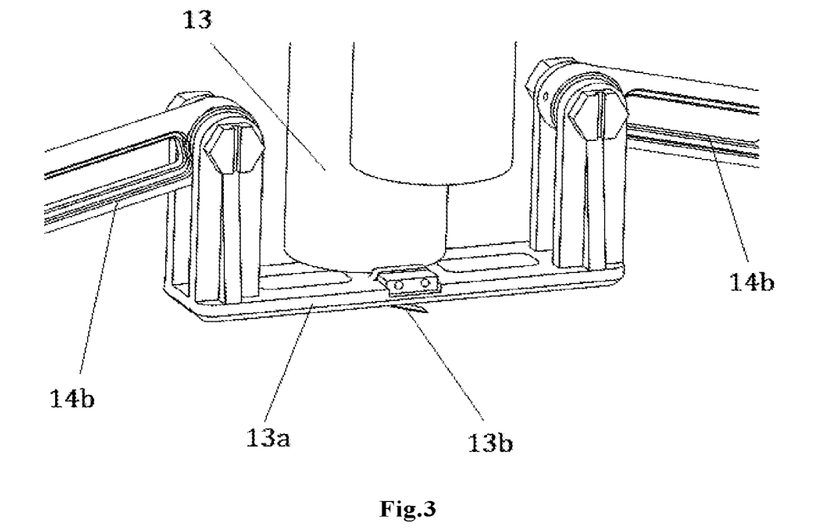
FIG. 3 is an amplified schematic diagram of the structure corresponding to an elliptical ring in FIG. 2.
Figure 4:
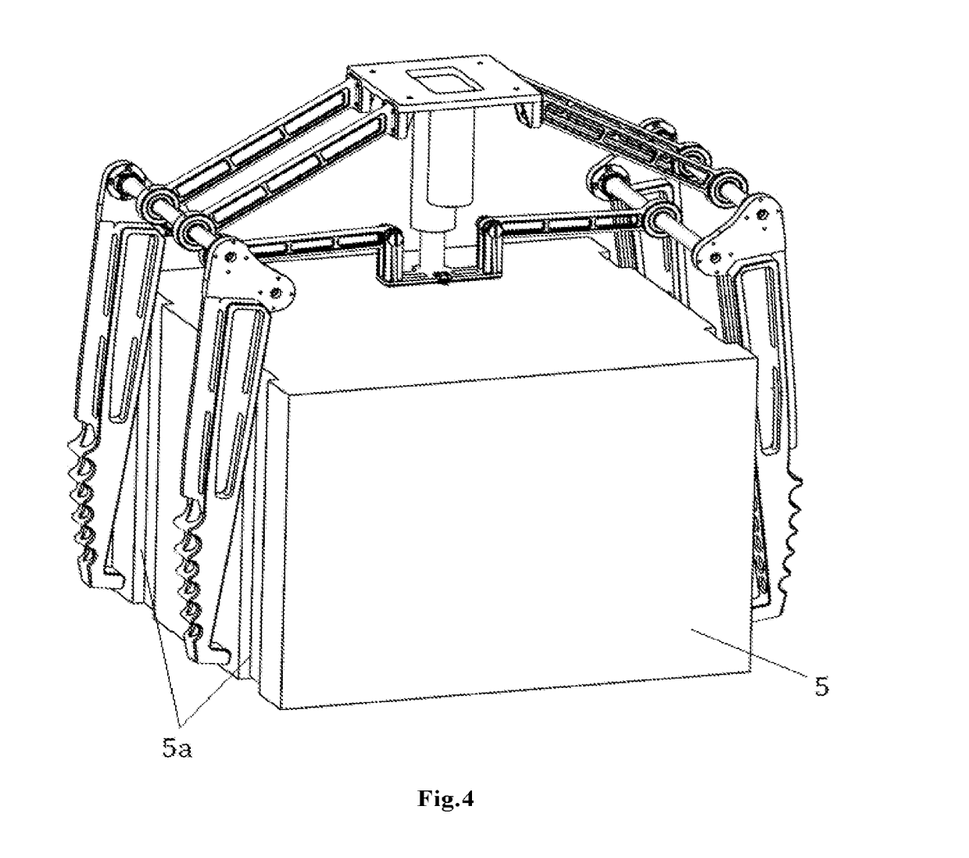
FIG. 4 is a schematic diagram of an unfolded state of carrying arms of an embodiment of an automatic unloading carrier of the present disclosure.
Figure 5:
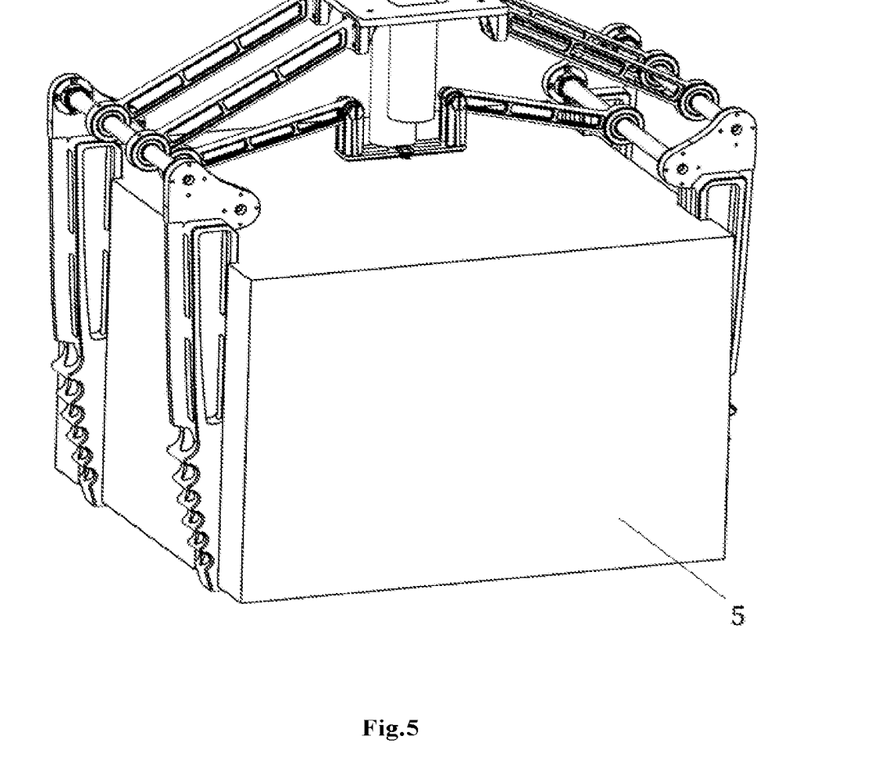
FIG. 5 is a schematic diagram of a folded state of carrying arms of an embodiment of an automatic unloading carrier of the present disclosure.
Figure 6:
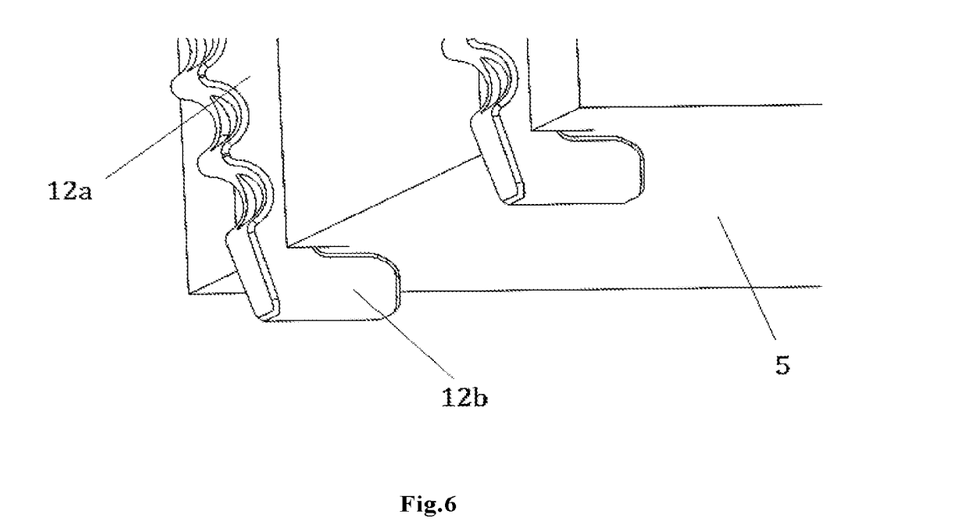
FIG. 6 is an amplified schematic diagram of a position relationship among an arm body, a supporting portion and a carried object when carrying arms of an embodiment of an automatic unloading carrier of the present disclosure is in a folded state.

The carrying arm 12 can specifically include an arm body 12a and a supporting portion 12b. The supporting portion 12b can be formed on the arm body 12a, for example, the supporting portion is be directly milled on the arm body 12a, or the arm body 12a and the supporting portion 12b can be directly formed by integral molding. The supporting portion 12b can also be arranged on the arm body 12a by a mounting component (e.g., a round peg, a screw and the like), a mounting structure (e.g., a screw structure, an embedding structure, an adhesive structure and the like).

During the folded state of the multiple carrying arms 12 (referring to FIG. 5), the arm body 12a and the supporting portion 12b can support and clamp the carried object 5. The arm body 12a and the supporting portion 12b can clamp different sides of the carried object 5 according to mating surfaces with the carried object 5, and support a bottom surface of the carried object 5, so that the carried object 5 can be stably carried. With reference to the state diagrams respectively shown in FIG. 4 and FIG. 5 and a mating structure shown in FIG. 6, it can be seen that a concave structure 5a can be formed on the side of the carried object 5 (which can also include the bottom surface), so that the arm body 12a is embedded in the side of the carried object 5. If the bottom surface is also provided with the concave structure, then the supporting portion 12b can also be embedded in the concave structure to form a supporting effect on the carried object 5. By adoption of such mating structure, the carrying arms 12 can form restraint on of the carried object 5 in more directions to avoid the movement of the carried object 5, so as to ensure that the carried object 5 isn't prone to drop off in a transportation process.

During the unfolded state of the multiple carrying arms 12 (referring to FIG. 4), the supporting and clamping limitations on the carried object 5 are released by the arm body 12a and the supporting portion 12b, so that the carried object 5 can deviate from the carrying arms 12 under the driving of its own gravity or other components.

The arm body 12a can move under the driving of the carrying arm driving mechanism, the motion mode can include movement or rotation, or mixed motion of movement and rotation. The root of the arm body 12a shown in FIG. 2 is articulated with the carrying arm driving mechanism and can rotate relative to the mounting base 11 under the driving of the carrying arm driving mechanism. Correspondingly, the supporting portions 12b of respective carrying arms 12 are at least formed or arranged at the free ends of the arm bodies 12a, and are capable of approaching to each other or separating from each other with the rotation of the arm bodies 12a.

When the arm bodies 12a expand outward under the driving, the free ends thereof separate from each other, so that the supporting portions 12b also depart from each other, thereby releasing the supporting function on the carried object 5. When the arm bodies 12a are folded inward under the driving, the free ends thereof approach to each other, so that the supporting portions 12b approach to each other, until the supporting portions 12b firmly clamp the carried object 5 and form stable supporting.

The supporting portion 12b can also be arranged at other positions of the arm body 12a besides being arranged at the free end of the arm body 12a, for example, the middle portion or the middle lower portion of the arm body 12a, more supporting portions may be added to obtain a more stable supporting function, and correspondingly, a structure mating with the supporting portion 12b can be formed or arranged on the outer contour of the carried object.

For the carried object, more carrying arms 12 can form constraint on the carried object in various directions. In order to facilitate the operation of the carrying arms 12, optionally, the multiple carrying arms 12 include at least two groups of carrying arms 12, and the at least two groups of carrying arms 12 are located on different sides of the carried object 5 respectively so as to form the clamping limit and supporting functions on multiple sides of the carried object 5. The carrying arms 12 shown in FIG. 2 include two groups, which are respectively located on opposite sides of the carried object 5, and correspondingly, two groups of carrying arms 12 can also be arranged on the opposite side of another vertical direction of the carried object 5 to form more stable clamping limit and supporting functions.

The number and arrangement positions of the carrying arms 12 can be considered in combination with factors such as the shape and the weight range of the carried object, and the loading capacity of the unmanned aerial vehicle and the like. For each group of carrying arms 12, if the arm bodies are wider, it can only include one carrying arm 12, and in order to reduce the own weight of the arm body 12, it can also include two or more carrying arms 12 with smaller width, the at least two carrying arms in each group of carrying arms 12 is fixedly connected with each other through a connector and is uniformly arranged relative to the side of the carried object 5.

In order to make the clamping and supporting functions of the carrying arms 12 on the carried object be more balanced, optionally, motion planes of different groups of carrying arms 12 located on opposite sides coincide. That is, different groups of carrying arms 12 located on opposite sides are rotatable in a same plane. In other embodiments, the motion planes of different groups of carrying arms 12 located on opposite sides can also not coincide, and it only needs to ensure that the center of gravity of the carried object falls between the carrying arms 12.

For the arm body 12a, optionally, the sectional dimension of the arm body 12a gradually decreases from the root to the free end, so that the root with greater mass is closer to a pivot, and the mass of the free end at a farther position is smaller, thereby reducing the driving torque and making the driving be easier. In other embodiments, a structure having the same sectional dimension from the root to the free end, or other sectional dimension relationships can also be employed as long as the arm body 12a can be driven to move and can achieve the clamping limit and supporting functions on the carried object 5 together with the supporting portion 12b.

A reinforced structure 12c, such as multiple groups of protrusions shown in FIG. 2, can be arranged adjacent to the free end on the arm body 12a, these protrusions can make the portion for supporting the carried object 5 of the free end not more prone to generate deformation or not prone to generate deformation of larger amplitude, thereby ensuring that the carried object 5 is supported more stably.

In order to improve the carrying capacity of the unmanned carrying vehicle, the weight of the automatic unloading carrier 1 can be reduced by reducing the weight of the arm body 12a as much as possible. In addition to modifying the structural form of the arm body 12a, optionally, multiple weight-reducing holes 12d are formed in the arm body 12a.

The carrying arm driving mechanism can directly drive the carrying arm 12 to move, and can specifically include a power output element 13 and a transmission element 14. The power output element 13 is fixedly mounted on the mounting base 11 and is connected with the multiple carrying arms 12 through the transmission element 14. The power output element 13 is capable of driving the multiple carrying arms 12 to move or rotate relative to the mounting base 11 by outputting power, so as to switch the unfolded state and the folded state of the multiple carrying arms 12.

Still referring to FIG. 2, the carrying arm 12 includes an arm body 12a and a supporting portion 12b, the supporting portion 12b is formed or arranged on the arm body 12a, the transmission element 14 includes a first connecting rod 14a and a second connecting rod 14b. Two ends of the first connecting rod 14a are rotatably connected with the root of the arm body 12a and the mounting base 11 respectively, two ends of the second connecting rod 14b are rotatably connected with the root of the arm body 12a and an output end of the power output element 13, and a rotation axis of the first connecting rod 14a at the root of the arm body 12a does not coincide with the rotation axis of the second connecting rod 14b at the root of the arm body 12a.

In the case that the multiple carrying arms 12 include at least two groups of carrying arms 12, and each group of carrying arms 12 includes at least two of carrying arms 12. A first connecting shaft 12e and a second connecting shaft 12f having different rotation axes are fixedly connected between the roots of the arm bodies 12a of the at least two of carrying arms 12 in each group of carrying arms 12, and the first connecting rod 14a and the second connecting rod 14b are respectively pivoted with the first connecting shaft 12e and the second connecting shaft 12f. Thus, under the driving of the power output element 13, the first connecting shaft 12e and the second connecting shaft 12f are driven by the first connecting rod 14a and the second connecting rod 14b to move, so that the multiple carrying arms 12 can synchronously move to avoid that the carried object cannot be disengaged in an appropriate posture when the carrying arms 12 are uncoordinatedly opened.

With respect to the selection of the power output element 13, a linear motor, an air cylinder or a hydraulic cylinder capable of outputting a linear stroke can be selected. In order to simultaneously drive the second connecting rods 14b of the multiple groups of carrying arms 12, the output end of the power output element 13 can be articulated with the second connecting rod 14b through a connecting base 13a, and the connecting base 13a can be fixedly connected to the output end of the power output element 13.

For the unmanned carrying vehicle such as an unmanned aerial vehicle or an unmanned vehicle, the various implementation form s of the above carrying arm driving mechanism can be automatically controlled by a controller on the unmanned aerial vehicle or the unmanned vehicle or be remotely controlled by a shipper of the carried object to achieve unfolding or folding of the multiple carrying arms 12, therefore, the automatic unloading carrier of the present disclosure can realize on-demand unloading and automatic unloading. Correspondingly, since the cooperation of a consignee in this unloading process is not necessary, the requirements on the experience of personnel coordination is relatively low. In addition, since the unmanned carrying vehicle can return according to the instruction of the shipper or automatically return after unloading at the delivery place, and can also go to the next delivery place according to the instruction of the shipper or automatically go to the next delivery place, it does not need to stay at the current unloading place for a long time, thus greatly improving the delivery efficiency of the unmanned carrying vehicle.

In addition to the automatic unloading function, the automatic unloading carrier 1 of the present disclosure can also automatically form a restraining effect for the carried object when the carried object is loaded into the loading position between the carrying arms, that is, a position detection switch for detecting whether the carried object 5 arrives at a loading position between the multiple carrying arms 12 is added in the automatic unloading carrier 1, so that the carrying arm driving mechanism drives the multiple carrying arms 12 to fold when the carried object 5 arrives at the loading position.

The position detection switch can include a non-contact sensing unit or a contact sensing unit. The non-contact sensing unit can include a sensor based on the principles of light, ultrasonic or electromagnetic, such as a photoelectric correlation tube, a proximity switch or the like. The contact sensing unit can include the sensitive switch 13b shown in FIG. 3 or the like. Correspondingly, the contact sensing unit can be arranged at a position corresponding to the carried object 5 below the connecting base 13a and can be triggered by the carried object 5 in a contact or extrusion manner when the carried object 5 arrives at the loading position.

The above-mentioned automatic unloading carrier 1 can be used for various kinds of unmanned carrying vehicles, especially suitable for unmanned aerial vehicles, so that the transportation efficiency of the unmanned aerial vehicles can be greatly improved, and the usage rate of the unmanned aerial vehicles is improved. In addition, the automatic unloading carrier 1 can also be used for other applications, for example, lifting devices.

In the embodiment of the unmanned aerial vehicle shown in FIG. 1, an undercarriage 4 can also be further arranged below the engine body 2 of the unmanned aerial vehicle for supporting the unmanned aerial vehicle on the ground during the taking-off and landing, and correspondingly, and the automatic unloading carrier 1 can be located between frameworks of the undercarriage 4.

Figure 7:
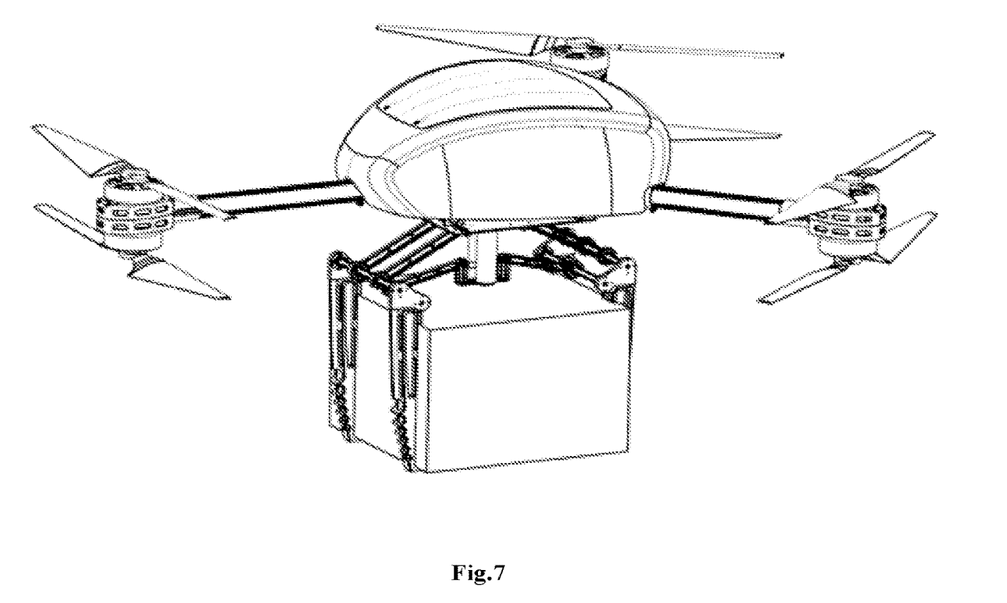
FIG. 7 is a structural schematic diagram of another embodiment of an unmanned aerial vehicle of the present disclosure.
Figure 8:
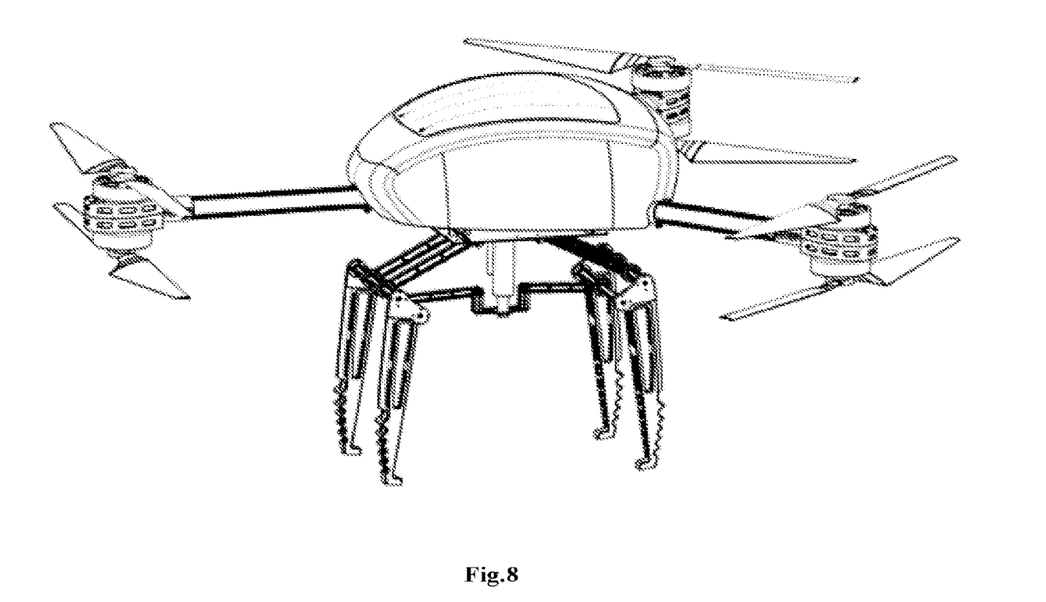
FIG. 8 is a structural schematic diagram of the embodiment of the unmanned aerial vehicle in FIG. 7 in an no-load state.

Another embodiment of the unmanned aerial vehicle is further provided in FIG. 7 and FIG. 8, the unmanned aerial vehicle of the present embodiment can cancel the undercarriage or disassemble the undercarriage compared with the unmanned aerial vehicle in the previous embodiments. That is, the landing supporting function of the unmanned aerial vehicle is realized by the carrying arms 12. Correspondingly, the free ends of the arm bodies 12a of at least three carrying arms 12 are optionally located on the same horizontal plane in the unfolded state of the multiple carrying arms 12, so as to achieve a stable supporting function. That is to say, when the unmanned aerial vehicle completes the delivery of the carried object 5, the carrying arms 12 can be used for the function of the undercarriage instead of undercarriage.

The specific working process of the unmanned aerial vehicle provided with the automatic unloading carrier 1 of the present disclosure will be described below with reference to FIG. 1 to FIG. 8.

The shipper of the carried object 5 places the carried object 5 between the carrying arms 12 at first. When the carried object 5 reaches the carrying position among the multiple carrying arms 12, an upper surface contour of the carried object 5 can trigger the sensitive switch 13b on the connecting base 13a, and the sensitive switch 13b can send a sensing signal to a control system of the unmanned aerial vehicle to prompt to the control system that the carried object 5 has reached the loading position at present. The control system of the unmanned aerial vehicle provides a control instruction to the power output element 13, so that the output end of the power output element 13 moves upward, in this way, the output end drives the second connecting rod 14b connected with the connecting base 13a to move upward. The second connecting rod 14b drives the second connecting shaft 12f to rotate around the first connecting shaft 12e, the corresponding multiple groups of carrying arms 12 connected with the second connecting shaft 12f rotate around the first connecting shaft 12e, thereby forming an inward folding action of the multiple groups of carrying arms 12, until the carrying arms 12 perform the clamping limit and supporting functions on the carried object 5.

The driving of the power output element 13 can also be controlled by a remote control system for directly grabbing cargoes on the ground, thereby the loading operations of the shipper can be omitted.

After the carried object 5 is completely loaded, the unmanned aerial vehicle can rise under the control of a flight control system and fly to a predetermined unloading place, or fly in accordance with a flight path provided by the instruction. When the flight control system of the unmanned aerial vehicle judges that the unmanned aerial vehicle has arrived at the unloading place, and the power output element 13 receives an unloading instruction issued by the controller of the unmanned aerial vehicle, or the unmanned aerial vehicle or the power output element 13 receives a remote unloading instruction of the shipper, the output end thereof moves downward to drive the second connecting rod 14b to move downward. The second connecting rod 14b drives the second connecting shaft 12f to rotate around the first connecting shaft 12e, and the corresponding multiple groups of carrying arms 12 connected with the second connecting shaft 12f rotate around the first connecting shaft 12e, thereby forming an outward unfolding action, until release the carried object 5.

A grating sensor can be further arranged at the undercarriage position of the unmanned aerial vehicle to detect whether the carried object 5 has been delivered. When it is confirmed that the carried object 5 has completely passed through the grating sensor, it indicates that the carried object 5 has completely deviated from the carrier, it can be determined that the delivery is completed at this time. After the signal of the grating sensor is confirmed by the flight control system of the unmanned aerial vehicle, the unmanned aerial vehicle can return or go to the next preset place.

The automatic unloading carrier and the unmanned aerial vehicle provided by the present disclosure have been described in detail above. The principles and embodiments of the present disclosure have been described herein with specific embodiments, and the descriptions of the above embodiments are only used for helping to understand the method of the present disclosure and its core idea. It should be noted that those of ordinary skilled in the art can still make several improvements and modifications to the present disclosure without departing from the principles of the present disclosure, and these improvements and modifications also fall within the protection scope of the claims of the present disclosure.

What is claimed is:

1. An automatic unloading carrier, comprising:
   a mounting base fixedly arrangeable on an unmanned carrying vehicle; and
   a driving mechanism configured to drive a carrying arm of multiple carrying arms, the multiple carrying arms connected with the mounting base through the driving mechanism, and configured to fold or unfold due to driving of the driving mechanism;

wherein the multiple carrying arms are configured to form a space for carrying a carried object during a folded state and release the carried object during an unfolded state; and wherein each of the multiple carrying arms comprises an arm body and a supporting portion, the supporting portion is formed or arranged on the arm body, and the arm body and supporting portion form a L-shaped structure, wherein the carried object is supported and clamped by the arm body and the supporting portion during the folded state of the multiple carrying arms, and the supporting and clamping limitations on the carried object are released by the arm body and the supporting portion during the unfolded state of the multiple carrying arms.

2. The automatic unloading carrier according to claim 1, wherein the arm body has a root and a free end, wherein the root of the arm body is articulated with the driving mechanism so that the arm body is rotatable relative to the mounting base under the driving of the driving mechanism, and the supporting portion of each of the carrying arms is at least formed or arranged at the free end of the arm body so as to approach to each other or separate from each other with rotation of the arm body.

3. The automatic unloading carrier according to claim 1, wherein the multiple carrying arms comprise at least two groups of carrying arms, the at least two groups of carrying arms are located on multiple sides of the carried object respectively.

4. The automatic unloading carrier according to claim 3, wherein each group of the at least two groups of carrying arms comprises at least two carrying arms, and the at least two carrying arms in each group are fixedly connected with each other through a connector and uniformly arranged relative to a side of the carried object.

5. The automatic unloading carrier according to claim 3, wherein one part and an other part of the at least two groups of carrying arms located on opposite sides are rotatable in a same plane.

6. The automatic unloading carrier according to claim 1, wherein the arm body has a root and a free end, and a sectional dimension of the arm body gradually decreases from the root to the free end.

7. The automatic unloading carrier according to claim 1, wherein the arm body has a free end, and a reinforced structure is arranged on the arm body adjacent to the free end.

8. The automatic unloading carrier according to claim 1, wherein multiple weight-reducing holes are formed on the arm body.

9. The automatic unloading carrier according to claim 1, wherein the driving mechanism comprises a power output element and a transmission element, wherein the power output element is fixedly mounted on the mounting base and connected with the multiple carrying arms through the transmission element, and the power output element is configured to drive the multiple carrying arms to move or rotate relative to the mounting base by outputting power, so as to switch a unfolded state and a folded state of the multiple carrying arms.

10. The automatic unloading carrier according to claim 9, wherein the carrying arm comprises an arm body and a supporting portion, the arm body has a root, the supporting portion is formed or arranged on the arm body, the transmission element comprises a first connecting rod and a second connecting rod, two ends of the first connecting rod are rotatably connected with the root of the arm body and the mounting base respectively, two ends of the second connecting rod are rotatably connected with the root of the arm body and an output end of the power output element, and a rotation axis of the first connecting rod at the root of the arm body does not coincide with a rotation axis of the second connecting rod at the root of the arm body.

11. The automatic unloading carrier according to claim 10, wherein the multiple carrying arms comprise at least two groups of carrying arms, each group of carrying arms comprise at least two carrying arms, a first connecting shaft and a second connecting shaft having rotation axes that do not coincide with each other are fixedly connected between the roots of the arm bodies of the at least two carrying arms in each group of carrying arms, and the first connecting rod and the second connecting rod are respectively pivoted with the first connecting shaft and the second connecting shaft.

12. The automatic unloading carrier according to claim 10, wherein the power output element comprises a linear motor, an air cylinder or a hydraulic cylinder, a connecting base is fixedly connected with the output end of the power output element, and the output end of the power output element is articulated with the second connecting rod through the connecting base.

13. The automatic unloading carrier according to claim 1, further comprising a position detection switch for detecting whether the carried object arrives at a loading position between the multiple carrying arms, so that the driving mechanism drives the multiple carrying arms to fold when the carried object arrives at the loading position.

14. The automatic unloading carrier according to claim 13, wherein the driving mechanism comprises a power output element and a transmission element, the power output element is fixedly mounted on the mounting base and connected with the multiple carrying arms through the transmission element, the position detection switch comprises a contact sensing unit, a connecting base is fixedly connected to an output end of the power output element, and the contact sensing unit is arranged at a position corresponding to the carried object below the connecting base, so that the contact sensing unit is triggered by the carried object in a contact or extrusion manner when the carried object arrives at the loading position.

15. The automatic unloading carrier according to claim 14, wherein the contact sensing unit comprises a microswitch.

16. The automatic unloading carrier according to claim 1, wherein the unmanned carrying vehicle is an unmanned aerial vehicle or an unmanned vehicle, and the driving mechanism is automatically controlled by a controller on the unmanned aerial vehicle or the unmanned vehicle or remotely controlled by a shipper of the carried object to achieve unfolding or folding of the multiple carrying arms.

17. The automatic unloading carrier according to claim 1, wherein the unmanned carrying vehicle is an unmanned aerial vehicle, the arm body has a free end, wherein the free ends of the arm bodies of at least three carrying arms of the multiple carrying arms are located on a same horizontal plane during the unfolded state of the multiple carrying arms, so as to support the unmanned aerial vehicle during taking off and landing.

18. An unmanned aerial vehicle, comprising an engine body and flying wings, wherein the unmanned aerial vehicle further comprises the automatic unloading carrier according to claim 1, and the automatic unloading carrier is arranged below the engine body through the mounting base.

19. The unmanned aerial vehicle according to claim 18, further comprising an undercarriage arranged below the engine body, wherein the automatic unloading carrier is located between frameworks of the undercarriage.

* * * * *

UNITED STATES PATENT AND TRADEMARK OFFICE
CERTIFICATE OF CORRECTION

| | |
|---|---|
| PATENT NO. | : 11,345,051 B2 |
| APPLICATION NO. | : 16/343558 |
| DATED | : May 31, 2022 |
| INVENTOR(S) | : Yi Zheng et al. |

It is certified that error appears in the above-identified patent and that said Letters Patent is hereby corrected as shown below:

On the Title Page

Item (73), the Assignee's name is incorrect. Item (73) should read:
-- (73) Assignee: BEIJING JINGDONG QIANSHI TECHNOLOGY CO., LTD., Beijing (CN) --

Signed and Sealed this
Third Day of October, 2023

Katherine Kelly Vidal
*Director of the United States Patent and Trademark Office*